3,200,099
THERMOSETTING COMPOSITIONS COMPRISING METHYLENE DIETHERS AND POLYMERS OF HYDROXY-CONTAINING ESTERS
Sheldon N. Lewis, Willow Grove, and Dominic R. Falgiatore, Philadelphia, Pa., assignors to Rohm & Haas Company, Philadelphia, Pa., a corporation of Delaware
No Drawing. Filed June 10, 1963, Ser. No. 286,465
13 Claims. (Cl. 260—80.5)

The present invention is concerned with thermosetting compositions having improved properties. It is primarily concerned with that type of thermosetting composition comprising a copolymer of a hydroxy-containing ester of an α,β-monoethylenically unsaturated acid.

It has been proposed, as in U.S. Patent 2,681,897 to provide a thermosetting composition comprising a hydroxyl-containing copolymer of this type with an aminoplast such as an alkylated melamine-formaldehyde condensate. However, with such compositions it is difficult to provide a hard product without encountering severe brittleness. It has also been suggsted to provide compositions comprising hydroxyl-containing copolymers of this type in admixture with a polyepoxide condensate but these compositions generally are characterized by poor storage stability and poor outdoor durability.

It is an object of the present invention to provide thermoseting compositions comprising a copolymer of a hydroxyl-containing ester of an α,β-monoethylenically unsaturated acid which is capable of being employed to provide films or other articles of a wide variety of hardness which retain a high degree of flexibility and resistance to impact while avoiding excessive brittleness even in the harder varieties of the products produced. It is another object of the invention to provide thermosetting compositions of this type which have excellent storage stability and produce films and other products having excellent outdoor durability and solvent resistance.

In accordance with the present invention, these objects are attained by providing compositions comprising a copolymer of monoethylenically unsaturated molecules comprising from 2 to 50 mole percent, and preferably about 5 to 15 mole percent, of a hydroxyl-containing ester of an α,β-monoethylenically unsaturated acid and, as a curing or cross-linking agent for the copolymer, a methylene diether of an alcohol, or of several alcohols, which is or are volatile under the curing conditions of temperature and/or pressure. The curing agent is thus selected from the group consisting of acetals and ketals which at the curing temperature, such as in the range of 140° F. to 450° F., react with the polymeric hydroxyl groups to liberate the less volatile alcohol (based on R and R' of Formula II).

The characteristic group of the compounds that serve as the curing or cross-linking agent is that of the formula

in which $R^0$ and $R^2$ are either hydrogen or hydrocarbon radicals, and they may be the same or different. The terminal bonds of the two oxygen atoms are connected to residues of alcoholic constituents from which it may be considered that the acetal or ketal is derived. Such alcoholic constituents, as stated, are sufficiently volatile to allow of their removal from the coating or impregnation during curing and they may be monohydric alcohols, glycols or other dihydric alcohol or other polyhydric alcohols. The specific structure of the characteristic group of Formula I is determined by the structure of the aldehyde or ketone from which the acetal or ketal may be considered to have been derived. This portion or moiety of the curing agent may or may not yield a substance volatile under the curing conditions since it appears that this portion is involved in reaction with the copolymer to effect the cross-linking thereof and therefore appears to remain in the cross-linked product.

The most important methylene diether curing agents may be generically represented by the formula

in which $R^0$ is selected from the group consisting of H and $(C_1-C_{10})$-hydrocarbon radicals, especially alkyl, cycloalkyl, aryl, alkaryl, and aralkyl groups, though alkenyl groups, such as vinyl and allyl may also be used, $R^2$ is selected from the group consisting of H and $(C_1-C_{10})$-hydrocarbon radicals, especially alkyl, cycloalkyl, aryl, alkaryl, and aralkyl groups, and R and R' are selected individually from the group consisting of an alkyl group having from 1 to 8 carbon atoms, cyclohexyl, and aralkyl groups having from 7 to 10 carbon atoms; thus, R and R' may be the same or different. Suitable polyacetals and polyketals which may be used include those of the formula

in which A is a polyvalent radical selected from the group consisting of $(C_1-C_{10})$-aliphatic hydrocarbon radicals, such radicals substituted by phenyl or alkoxy groups, phenylene radicals, phenylene radicals having 1 to 4 $(C_1-C_4)$-alkyl substituents, $(C_4-C_{10})$-alkylene radicals interrupted by oxygen or sulfur atoms, especially those containing $(C_2-C_3)$alkyleneoxy-$(C_2-C_3)$alkylene units, $R^0$, $R'$, and $R^2$ are as defined hereinbefore, and
n is an integer having a value of 2 to 4, and preferably 2.

Examples of polyacetals include:

1,6-di(methoxymethoxy)hexane
1,8-di(butoxymethoxy)octane
The di(ethoxymethyl)ether of diethylene glycol
The tetra(methoxymethyl)ether of pentaerythritol
The tri(methoxymethyl)ether of glycerol
The tri(methoxymethyl)ether of butanetriol-1,2,3
Di(methoxymethyl)ether of resorcinol.

Examples of polyketals include:

1,6-di(butoxyisopropoxy)hexane
1,8-di(methoxyisopropoxy)octane.

Examples of ketals, in which neither $R^0$ nor $R^2$ can be hydrogen, include:

2,2-dimethoxy-propane
2,2-dimethoxy-butane
2,2-dibutoxy-propane
2,2-di(cyclohexoxy)propane
2,2-di(benzyloxy)propane.

The most important acetals (except for the formals) are represented by the formula

wherein the symbols are as defined hereinbefore.

Examples of useful acetals include 1,1-diethoxy-ethane
3,3-diethoxy-propene-1
1,1,3,3-tetraethoxy-propane
1,1-dibutoxy-ethane.

Especially valuable from the standpoints of cost, availability, and effectiveness are the formals of the formula $$RO-CH_2-OR' \quad (V)$$

wherein R and R' are as defined hereinbefore.

Preferred formals are the formals having from 3 to 9 carbon atoms and in which the oxygen atoms are attached to primary carbon atoms of the R and R' groups. Methylal may be used and can be cured even at temperatures as low as 140° F.

Representative of the hydroxyalkyl esters of the $\alpha,\beta$-unsaturated carboxylic acids which may be used to form copolymers used in the practice of the present invention are 2-hydroxyethyl acrylate, methyl $\alpha$-(hydroxymethyl)-acrylate, ethyl $\alpha$-(hydroxymethyl)-acrylate, butyl $\alpha$-(2-hydroxyethyl)-acrylate, 2-hydroxypropyl acrylate or methacrylate, 3-hydroxypropyl acrylate or methacrylate, methyl $\alpha$-(2-hydroxypropyl)-acrylate, ethyl $\alpha$-(3-hydroxypropyl)-acrylate, 4-hydroxybutyl acrylate, 5-hydroxyamyl acrylate, 6-hydroxyhexyl acrylate, 7-hydroxyheptyl acrylate, 8-hydroxyoctyl acrylate, 9-hydroxynonyl acrylate, 10-hydroxydecyl acrylate, 2-hydroxyethyl methacrylate, 6-hydroxyhexyl methacrylate, 8-hydroxyoctyl methacrylate, 10-hydroxydecyl methacrylate, 3-hydroxypropyl crotonate, 5-hydroxyamyl crotonate, 6-hydroxyhexyl crotonate, 7-hydroxyheptyl crotonate, 10-hydroxydecyl crotonate, di(2-hydroxyethyl)maleate, di(4-hydroxybutyl)-maleate, di(6-hydroxyhexyl)maleate, di(9-hydroxynonyl)maleate, di(10-hydroxydecyl)maleate, di(2-hydroxyethyl)-fumarate, di(4-hydroxybutyl)fumarate, di(6-hydroxyhexyl)fumarate, di(10-hydroxydecyl)fumarate, and the like. Additionally, other substituents may be incorporated into the alkyl chain, including secondary hydroxy groups, halide radicals, nitrile radicals, and the like, such as 2,3-dihydroxypropyl acrylate, 3,5-dihydroxyamyl crotonate, 6,10-dihydroxydecyl methacrylate, di-2,6-dihydroxyhexyl maleate, di-2-chloro 7-hydroxyheptyl fumarate and the like. Obviously, mixtures of these esters may be used in the copolymer formation. In all cases, the hydroxyl of each hydroxyalkyl group is at least two carbon atoms removed from the carbon atom of the adjacent —COO— radical in the ester.

The composition of the copolymer preferably includes from 5 to 15 mol percent of an hydroxyalkyl acrylate or methacrylate of the formula

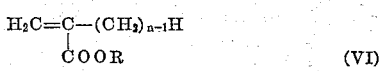

in which $n$ is an integer having a value of 1 to 2, and R is an hydroxyalkyl group having 2 to 10 carbon atoms and having at least one hydroxyl group attached to a carbon atom other than that attached to the —COO— group, and is preferably of the formula

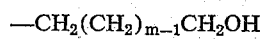

wherein $m$ is 1 or 2.

The copolymer may comprise up to 5%, and preferably does comprise from ½ to 5%, by weight of a copolymerizable unsaturated acid, such as maleic acid, fumaric acid, aconitic acid, citraconic acid, crotonic acid; but for most practical purposes acrylic acid, methacrylic acid, or itaconic acid is preferred. The inclusion of the acid in the copolymer is particularly desirable when pigmented compositions are used since it markedly enhances the gloss of coatings obtained from such compositions.

Other monoethylenically unsaturated compounds copolymerizable with the hydroxyl (and acidic) monomers which may be used include esters of acrylic acid or methacrylic acid with cyclohexanol, benzyl alcohol, or alkanols having 1 to 18 carbon atoms and preferably from 1 to 4 carbon atoms; acrylonitrile, methacrylonitrile, styrene, or vinyltoluene, acrylamide, methacrylamide, N-methylolacrylamide, vinylidene chloride, and vinyl acetate. The hardness, flexibility, toughness, and adhesion for various substrates can be varied widely as desired by suitably adjusting the proportions of these various monomers. For example, a copolymer containing 95% of an ester of acrylic acid such as methyl, ethyl, or butyl acrylate with 5% of $\beta$-hydroxy-ethyl acrylate or methacrylate produces films which are extremely flexible and adherent. On the other hand, a copolymer of 95% by weight of methyl methacrylate with 5% by weight of $\beta$-hydroxyethyl acrylate or methacrylate produces an extremely hard film, which is suitable for relatively rigid substrates but is insufficiently flexible to be applied to highly flexible substrates such as of paper, leather, or textiles.

The copolymers may be prepared in any suitable fashion. They generally may have any molecular weight, such as from about 500 to several million number average. For making the polymers in the lower portion of the range, up to 500,000, solution polymerization, particularly in a solvent which may be employed as the solvent for the coating application, is ordinarily preferred. For making the polymers in the upper portion of the range, emulsion polymerization is most useful. The use of chain transfer agents in an emulsion system can also be resorted to for making polymers in the lower molecular weight range. In the solution system, the monomers comprising the hydroxyalkyl ester and other monoethylenically unsaturated compounds in the proportions needed to give the composition hereinabove defined are mixed in the solvent at a concentration of about 10 to 60% total monomer in the entire solution and any suitable free-radical initiator soluble in the solvent is introduced. The initiator may be an azo catalyst, a peroxygen compound, such as t-butyl peracetate, or a peroxide, such as benzoyl peroxide, or a hydroperoxide, such as t-butyl hydroperoxide, or cumene hydroperoxide. The solution is heated to reflux to effect copolymerization and held at reflux for a period of 2 to 6 hours or more. Thereafter, the solution of the copolymer may be cooled and the formal may be introduced with adjustment of the solvent content to provide the concentration desired. Pigments, extenders, curing catalyst, and any other adjuvants may then be added.

The solvents that may be employed include such hydrocarbons as benzene, toluene, xylenes, and aromatic naphthas or mixtures of such solvents; esters such as ethyl, butyl, amyl, ethoxyethyl, or methoxyethyl acetates, lactates, or propionates; ketones such as acetone, methyl isopropyl ketone, methyl isobutyl ketone, dioxane, isophorone, and cyclohexanone; alcohols such as n-butanol, t-butanol, isopropyl alcohol, n-propyl alcohol, amyl alcohols, and cyclohexanol; ethers such as diethyl ether, the monoethyl ether of ethylene glycol, the monomethyl ether of ethylene glycol, and the monobutyl ether of ethylene glycol; and miscellaneous solvents including dimethylformamide, dimethylacetamide, actonitrile, nitromethane, nitroethane, nitropropane, and nitrobutane; as well as mixtures of two or more solvent materials either from the same group or any or all of the groups just listed.

When the polymers are made by the emulsion polymerization system, it is preferred to emulsify the diether with the monomers in the aqueous polymerization system, and then to polymerize the monomers using the conventional catalyst, with or without a chain transfer agent. The resulting polymer dispersion containing the diether is then ready for introduction of the acidic catalyst and application for coating and impregnating purposes.

The relative proportions between the copolymer and the methylene diether may vary widely. In general, the amount of such diether that is used should at least be sufficient to correspond in functionality to the amount needed to crosslink at least 2 mole percent of the hydroxy-containing units in the copolymer. This means from the standpoint of stoichiometric equivalency that there would be at least 1 mole of the diether for each 2 hydroxyl groups in the copolymer if the copolymer were to contain only 2 mole percent of the hydroxy-containing units. It is obvious that if there is a large content of hydroxyl in the copolymer, less than the equivalent amount of the diether may be used to provide the cross-linking of at least 2 mole percent of the units in the copolymer. In general, however, where it is undesirable in the particular use to which the product is to be put to have an appreciable water sensitivity, the amount of diether used should be at least that which will crosslink all of the hydroxyl functionality of the copolymer. In many cases, it has been found desirable and preferred to provide an excess of the diether over the amount theoretically needed to crosslink all of the hydroxyl units, and this excess may be as high as twice, three times, or even four times the amount that is equivalent to the amount of hydroxyl groups to be reacted. In a low molecular weight copolymer, it may be desirable to have a large proportion of hydroxyl-containing units such as 30 mole percent or more, whereas in a high molecular weight copolymer equivalent products in respect to solvent resistance, etc. may be obtainable with as low as 2 mole percent of hydroxyl-containing unit.

The dialkyl formal may be formed in situ in a solution of the hydroxyl-containing polymer. For this purpose, the alcohol that is to be used in forming the acetal may form part or all of the solvent in which the polymer is dissolved. To this solution in an alcohol or other solvent, there may be added in appropriate proportions as indicated hereinabove, a mixture of the particular aldehyde desired and the particular alcohol or mixture of alcohols desired to be formed into the dialkyl formal. In general, the amount of alcohol should be at least two moles for each mole of aldehyde employed, and in general as much as a 100 to 300% excess of the alcohol may be used. The solution containing the polymer, the aldehyde and the alcohol may then be heated to reflux to effect the reaction. Examples of temperatures may range from about 50 to 130° C., and time may vary from 10 minutes to an hour or more. In the case of extremely volatile aldehydes such as formaldehyde and extremely volatile alcohols such as methanol or ethanol, the reaction may be carried out under pressure to enable higher temperatures in the range specified to be employed for the purpose of hastening the reaction. Part of the solvent used may be such that it forms an azeotrope with the water of condensation so that the water can be removed from the scene of the reaction. After the desired extent of condensation has been achieved, the reaction mixture may be cooled and stored for subsequent use or shipment.

The mixture of the diether and the copolymer may be used without a solvent if the formal happens to be a solvent for the copolymer, and is used in an amount sufficient to dissolve all of the copolymer used in making the composition. However, in general, both of these essential components are dissolved in another solvent of inert character and the solution is adapted to be used for coating or impregnating purposes. Even at room temperatures, there may be an interchange reaction between some of the methylene diethers and the hydroxyl group of the polymer until an equilibrium state is attained. However, it has been found that this reaction does not involve any appreciable cross-linking of the polymer. The composition is still stable for long periods of time under normal conditions of storage, remaining of soluble and fusible character. It is to be understood that, when reference herein is made to the mixture of the hydroxyl-containing copolymer and the methylene diether, the mixture is intended to embrace the products of any equilibrium reaction between these two components occurring on their admixture at the prevailing ambient temperature.

Before application or use, there is introduced into the composition a small amount of an acidic catalyst. In general, strong inorganic acid catalysts may be used as well as the so-called "Lewis" acid catalysts such as boron trifluoride, zinc chloride, etc. Inorganic salts which are of acidic character, such as ammonium nitrate, or ammonium chloride, may be used and zinc salts of strong inorganic acids are also quite useful, such as zinc perchlorate, zinx fluoborate, zinc chloride, bromide or iodide. Zinc perchlorate is outstanding in its effectiveness with a wide variety of the mixtures. The amount of acid catalyst used is generally in the range of 0.5 to 2% by weight based on the solids content of the composition or on the total weight of the methylene diether and hydroxyl-containing copolymer.

The unpigmented compositions produce clear, glossy films, the hardness or softness of which can be adjusted by suitable selection of the composition of the copolymer. One of the outstanding peculiarities and advantages of the system of the present invention is the fact that the methylene diether has very little effect on the hardness of the product. It is because of this fact that extremely hard compositions are obtainable which still have excellent flexibility and impact resistance and are not brittle. Even very soft films obtained from the composition of the present invention can be made which are not susceptible to "printing," that is, indentation by impressing of the finger or fingernail.

The compositions may be pigmented, the amount of pigment being from ½% to 200% based on the binder weight, that is the sum of the weights of the diether and hydroxyl-containing copolymer.

Pigments suitable for use according to the invention are inorganic pigments such as, for example, chrome yellows, Prussian blues and Brunswick greens, titanium pigments such as titanium dioxide, extended titanium pigments (extended with either precipitated or natural extenders, such as alkali earth sulfate for instance calcium sulfate, barium sulfate, and the like), tinted titanium pigments, titanates such as barium, zinc, lead, magnesium titanates, and the like. Additionally, other types of inorganic pigments might be included, such as zinc sulfide pigments, for instance, zinc sulfide, lithopone, other extended zinc sulfide pigments, such as calcium base lithopone, zinc sulfide extended with natural extenders and the like, zinc oxide and antimony oxide, or organic pigments; that is, organic coloring matters which are devoid of sulfonic, carboxylic, or other water-solubilizing groups. Also, for the purposes of this invention, we include within the term "pigment" other water-insoluble organic coloring matters such as, for example, the calcium or barium lakes of azo lake dyestuffs.

Besides the methylene diether and the hydroxyl-containing copolmer, the compositions of the present invention may also contain one or more of the following: aminoplast resins, such as alkylated melamine-formaldehyde condensates, phenoplasts, polyepoxides, and alkyd resins. The proportions of the latter materials may be from ½% to 5% or more, based on the weight of the copolymer. In general, however, these additional materials are not necessary to provide the desirable properties of the compositions as set out hereinbefore.

The compositions herein may be applied for the coating of a wide variety of substrates including paper, textiles, leather, wood, ceramics, brick, stone, and concrete surfaces, as well as metals. Thus, they may be used as finishing topcoats for automobiles or for the decoration of metals in general, such as tin cans or other canisters. They are particularly suitable for the finishing of household appliances, such as stoves, refrigerators, and so on because of their resistance to modern detergents.

The compositions, after addition of the acidic catalyst and application to the substrates to be coated, are dried and cured. Drying may be effected at room temperature or at elevated tempertaures such as at 140° F. up to 220° F. and baking may be effected at temperatures anywhere from 140° to 450° F. As is obvious from the preceding statement, drying and curing may be considered as part of one operation, the curing following the drying immediately. The time of curing may vary from a period as short as one-half to two minutes at the upper range of temperature around 450° F. up to one hour or two at the lower portion of the temperature range given, namely 140° F. A particularly practical curing operation is effected at 300° F. for a period of 15 to 30 minutes or so. In general, the temperature of curing is sufficiently high to volatilize rapidly the alcohol developed from the OR and OR' groups of the diether during curing. One of the outstanding advantages of the present invention is the fact that a low temperature of 140 to 180° F. or thereabout is adequate to produce a well-cured product, whereas the compositions of the prior art utilizing hydroxyl-containing copolymers generally required a higher temperature in order to obtain equivalent curing in a given period of time.

In the examples which follow and are illustrative of the present invention, the parts and percentages are by weight unless otherwise specified.

*Example 1*

To a composition of 45 parts titanium dioxide pigment and 110 parts of a 50% solution in a 1:1 xylene:2-ethoxyethyl acetate solvent of a copolymer (mol. wt. about 100,000) of methyl methacrylate:ethyl acrylate:β-hydroxyethyl methacrylate:methacrylic acid (proportions of 45:45:10:2) there is added 6.77 parts of dibutoxymethane (about one mole equivalent based on copolymer hydroxyl functionality) and 2.75 parts of a 20% zinc perchlorate solution in n-butanol.

A sprayed film (about 1.4 mil thickness) of the above enamel on iron phosphate-treated steel panels, baked at 300° F. for 30 minutes, exhibited excellent adhesion, a Knoop hardness number (KHN) of 15.3, a pencil hardness of 4H, outstanding flexibility when bent over an ⅛-inch mandrel, good print resistance (faint impression at 180° F. under 2 p.s.i. for ½ hour), and softening to a 6B pencil hardness when immersed in 2-ethoxyethyl acetate for 30 minutes.

*Example 2*

(a) To 110.0 parts of the copolymer solution of Example 1 is added 6.77 parts of dibutoxy methane and 2.75 parts of a 20% zinc perchlorate solution in n-butanol.

A dried 1-mil clear film cast of the above solution on iron phosphate-treated steel panels baked at 300° F. for thirty minutes, showed excellent adhesion, a KHN of 12.5, a pencil hardness of 2H, outstanding flexibility, excellent print resistance (no impression or print at 180° F. under 2 p.s.i. for ½ hour), a softening to 6B pencil hardness after immersion in 2-ethoxyethyl acetate for 30 minutes, and 30 inch-pounds reverse impact resistance.

(b) A flexible, adherent, solvent-resistant film is obtained when part (a) is repeated except that instead of the copolymer therein used there is substituted a copolymer of 25% vinyl chloride, 65% ethyl acrylate, and 10% of 8-hydroxyoctyl methacrylate.

*Example 3*

(a) Example 2(a) is repeated utilizing a copolymer (mol. wt. 80,000) of 18% methyl methacrylate, 28% vinyltoluene, 43% ethyl acrylate, 10% β-hydroxypropyl methacrylate and 1% acrylic acid in place of the copolymer of Example 2 and using 6.19 parts of the dibutoxy methane in n-butanol.

Dried 1-mil clear films cast of the above solution on iron phosphate-treated steel panels baked at 300° F. for thirty minutes, exhibit properties essentially similar to those in Example 2.

(b) Similar results are obtained when the methylol is replaced by an equivalent amount of benzylal, 2,2-di(cyclohexyloxy)-butane, 2,2-di(benzyloxy)-butane, 1,1,3,3-tetraethoxy-propane, the di(ethoxymethyl) ether of diethylene glycol, or the dimethoxymethyl ether of resorcinol.

*Example 4*

(a) Example 2(a) is repeated replacing the catalyst with 3.0 parts of a 20% zinc fluoborate solution in n-butanol and utilizing 6.42 parts of dimethoxymethane (about two mole equivalents based on copolymer hydroxyl functionality) in place of the dibutoxymethane.

Dried 1-mil clear films cast of the above solution, baked at 300° F. for 30 minutes on iron phosphate-treated steel panels, possessed excellent adhesion, a KHN of 9.7, a pencil hardness of H+, outstanding flexibility, no print at 180° F. under 2 p.s.i. for 30 minutes, a softening to 6B pencil hardness after immersion in 2-ethoxyethyl acetate solvent for 30 minutes, and 25 in.-lbs. reverse impact resistance.

(b) Similar results are obtained when part (a) is repeated except that the copolymer solution is replaced with 120 parts of a 46% solution in a 1:1 xylene/2-ethoxyethyl acetate solvent of a copolymer (mol. wt. about 130,000 number average) of 20% vinylidene chloride, 10% vinyl acetate, 45% 2-ethylhexyl acrylate and 25% of hydroxyethoxyethyl methacrylate.

*Example 5*

Example 1 is repeated substituting for the dibutoxymethane, 6.42 parts of dimethoxymethane.

Sprayed films of 1.3–1.5-mil thickness of the above enamel on iron phosphate-treated steel panels, baked at 300° F. for 30 minutes show excellent adhesion, a KHN of 15, a pencil hardness of 3H, outstanding flexibility over an ⅛-inch mandrel, good print resistance (light impression at 180° F. under 2 p.s.i. for 30 minutes) and softening to a 6B+ pencil hardness after immersion in 2-ethoxyethyl acetate for 30 minutes.

*Example 6*

Example 2(a) is repeated, utilizing 2.75 parts of a 20% solution of zinc chloride in n-butanol as the catalyst.

A 1-mil dried film of the above solution, baked on cold-rolled steel, possessed good adhesion, outsanding flexibility over an ⅛-inch mandrel, a 2H pencil hardness, softening to a 6B pencil hardness after immersion in 2-ethoxyethyl acetate for 30 minutes, and 40 in.-lbs. reverse impact resistance.

*Example 7*

Example 2(a) was repeated substituting for dibutoxymethane, 8.81 parts of 2,2-dimethoxypropane and using 5.5 parts of 20% zinc perchlorate solution in n-butanol as the catalyst.

A 1-mil dried film of the above solution baked at 300° F. for 30 minutes on cold-rolled steel, exhibited good adhesion, excellent flexibility over an ⅛-inch mandrel, a 2H pencil hardness, softening to a 6B pencil hardness after immersion in 2-ethoxyethyl acetate solvent for 30 minutes, and 30 in.-lbs. reverse impact resistance.

*Example 8*

Example 2(a) was repeated substituting for the dibutoxymethane, 17.3 parts of 1,6-di(methoxymethoxy)-hexane and using 5.5 parts of a 20% zinc perchlorate solution in n-butanol as the catalyst.

A 1-mil dried film of the above solution, baked at 300° F. for 30 minutes on cold-rolled steel, showed excellent flexibility over an ⅛-inch mandrel, good adhesion, 2H pencil hardness, softening to a 6B pencil hardness after immersion in 2-ethoxyethyl acetate for 30 minutes, and 30 in.-lbs. reverse impact resistance.

*Example 9*

Example 2(a) was repeated replacing the dibutoxymethane with 11.0 parts of acrolein diethyl acetal and using 5.5 parts of 20% zinc perchlorate solution in n-butanol as the catalyst.

A 1-mil dried film of the above solution, baked on cold-rolled steel at 300° F. for 30 minutes, exhibited good adhesion, outsanding flexibility over an ⅛-inch mandrel, a 2H pencil hardness, softening to a 6B pencil hardness after immersion in 2-ethoxyethyl acetate for 30 minutes and 35 in.-lbs. reverse impact resistance.

*Example 10*

To 110.0 parts of a 50% solution in xylene of a copolymer (mol. wt. 60,000) composed of 10% methyl methacrylate, 10% styrene, 58% methyl acrylate, 20% β-hydroxyethyl methacrylate and 2% itaconic acid there was added 4.75 parts of acrolein, 25.0 parts of n-butanol and 2.75 parts of 20% zinc chloride solution in n-butanol as a catalyst. The mixture was stirred and heated at 80° for 90 minutes, and distilled to a maximum temperature of 137° C. The distillate was then replaced with 25.0 parts of n-butanol.

A 1-mil dried film of the above solution, baked on cold-rolled steel at 300° F. for 30 minutes, possessed excellent flexibility and adhesion, a 2H pencil hardness, softening to a 6B pencil hardness after immersion in 2-ethoxyethyl acetate solvent for 30 minutes, and 30 in.-lbs. reverse impact resistance.

*Example 11*

To 100.0 parts of a 50% solution in xylene of a copolymer of 10% methyl methacrylate, 20% acrylonitrile, 34.5% ethyl acrylate, 34% β-hydroxyethyl methacrylate and 1.5% methacrylic acid there were added 2.43 parts of 95% paraformaldehyde, 11.72 parts of n-butanol and 2.5 parts of a 20% zinc chloride solution in n-butanol.

The turbid reaction mixture is stirred and heated at 80° C. until clear (usually between 30 and 60 min.). Water is then removed by azeotropic distillation and collected by displacement in a water-separating trap containing saturated aqueous n-butanol. The reaction is complete when the distillation temperature approaches a maximum of 130–133° C.

A 1-mil dried film of the above solution, baked on cold-rolled steel at 300° F. for 30 minutes, has excellent adhesion and flexibility, a 2H pencil hardness, softening to a 6B pencil hardness after immersion in 2-ethoxyethyl acetate for 30 minutes, and 40 in.-lbs. reverse impact resistance.

*Example 12*

To a solventless, low molecular weight (500 number average) copolymer of 69.4 parts butyl acrylate and 30.6 parts of β-hydroxyethyl methacrylate there were added 75.2 parts of dibutoxy methane and 10.0 parts of a 20% solution of zinc perchlorate in n-butanol (representing 2% catalyst based on acrylic copolymer solids).

A 1-mil dried film of the above solution, baked on cold-rolled steel at 300° F. for 30 minutes had excellent adhesion, good flexibility, an HB pencil hardness, softening to a 6B pencil hardness after immersion in 2-ethoxyethyl acetate for 30 minutes, and 40 in.-lbs. reverse impact resistance.

*Example 13*

Example 12 was repeated, substituting for dibutoxy methane, 17.9 parts of dimethoxy methane.

A 1-mil dried film of the resulting solution had good adhesion, good flexibility, a 6B pencil hardness, softening to a 6B pencil hardness after immersion in 2-ethoxyethyl acetate for 30 minutes, and 40 in.-lbs. reverse impact resistance.

*Example 14*

To a solventless, low molecular weight (2000 number average) copolymer of 68.8 parts of butyl acrylate and 31.2 parts of β-hydroxypropyl methacrylate there was added 70.4 parts of dibutoxy methane and 10.0 parts of a 20% solution of zinc perchlorate in n-butanol.

A 1-mil dried film of the above solution, baked on cold-rolled steel at 300° F. for 30 minutes, exhibited excellent adhesion, good flexibility, an HB pencil hardness, softening to a 6B pencil hardness after immersion in 2-ethoxyethyl acetate for 30 minutes, and 40 in.-lbs. reverse impact resistance.

*Example 15*

Example 14 was repeated, substituting for dibutoxy methane, 16.7 parts of dimethoxy methane.

A 1-mil dried film of the resulting solution baked on cold-rolled steel at 300° F. for 30 minutes possessed good adhesion, good flexibility, a 6B pencil hardness, softening to a 6B pencil hardness after immersion in 2-ethoxyethyl acetate for 30 minutes, and 40 in.-lbs. reverse impact resistance.

*Example 16*

A monomer emulsion consisting of 187.2 grams of ethyl acrylate, 12.8 grams of β-hydroxyethyl methacrylate, 31.6 grams of dibutoxy methane, 10.0 grams of t-octylphenoxypolyethoxyethanol having about thirteen oxyethylene units, 0.23 gram of sodium lauryl sulfate, and 462.15 grams of deionized water is charged to a glass reaction vessel provided with a nitrogen atmosphere. The emulsion is stirred, cooled to 20° C., and immediately charged with 8.0 ml. of a 0.175% solution of ferrous sulfate, 8.0 ml. of a 4.0% solution of sodium hydrosulfite and 16.0 ml. of a 2.26% solution of potassium persulfate. When the reaction has attained its maximum peak temperature, 64–65° C., a second monomer emulsion charge comprising 561.6 grams of ethyl acrylate, 38.4 grams of β-hydroxyethyl methacrylate, 94.8 grams of dibutoxy methane, 30.0 grams of t-octylphenoxypolyethoxyethanol having about thirteen oxyethylene units, 0.69 grams of sodium lauryl sulfate and 309.75 grams of deionized water is added slowly and simultaneously with 50.0 ml. of a 2.16% solution of potassium persulfate and 50.0 ml. of a 3.0% solution of sodium metabisulfite. The above addition feed rates are controlled so as to maintain a temperature of 64–65° C. After the additions have been computed, stirring is continued until a marked decrease in reaction temperature is observed. The final latex emulsion when cooled to room temperature has a pH of 2.7, a solids content of 45.0% and a viscosity of 295 centipoises. A film of the latex (which is sufficiently acid to require no additional catalyst) is cast on glass, dried in air, baked 30 minutes at 300° F. The film has a low equilibrium swelling ratio in xylene indicating excellent crosslinking. A similar film dried in air but not baked is soluble in xylene. If a small amount, e.g., 0.3% on solids of the latex, of a catalyst such as zinc perchlorate is added, the curing is even more efficient in respect to baking time required for attaining a given extent of insolubilization.

We claim:

1. A composition comprising a methylene diether of the formula

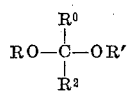

in which
R⁰ is selected from the group consisting of H and ($C_1$–$C_{10}$)-hydrocarbon radicals,
R² is selected from the group consisting of H and ($C_1$–$C_{10}$)-hydrocarbon radicals, and
R and R′ are selected individually from the group consisting of cyclohexyl, alkyl groups having 1 to 8 carbon atoms and aralkyl groups having 7 to 10 carbon atoms, and a linear water insoluble copolymer of monoethylenically unsaturated molecules consisting of 2 to 50 mol precent of a hydroxyl-containing ester of an α,β-monoethylenically unsaturated acid and from 98 to 50 mole percent of at least one monoethylenically unsaturated monomer copolymerizable with said hydroxyl containing ester, the amount of diether being at least an amount stiochiometrically equivalent to the hydoxyl content of a copolymer containing 2 mol percent of hydroxyl-containing units.

2. A composition comprising a solution in an organic solvent of methylene diether of the formula

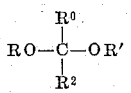

in which
R⁰ is selected from the group consisting of H and $(C_1-C_{10})$-hydrocarbon radicals,
R² is selected from the group consisting of H and $(C_1-C_{10})$-hydrocarbon radicals, and
R and R' are selected individually from the group consisting of cyclohexyl, alkyl groups having 1 to 8 carbon atoms and aralkyl groups having 7 to 10 carbon atoms, and a linear water-insoluble copolymer of monoethylenically unsaturated molecules consisting of 2 to 50 mol percent of a hydroxyl-containing ester of an $\alpha,\beta$-monoethylenically unsaturated acid and from 98 to 50 mole percent of at least one monoethylenically unsaturated monomer copolymerizable with said hydroxyl containing ester, the amount of diether being at least an amount equivalent to the hydroxyl content of a copolymer containing 2 mol percent of hydroxyl-containing units.

3. A composition comprising a methylene diether of the formula

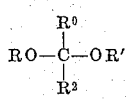

in which
R⁰ is selected from the group consisting of H and $(C_1-C_{10})$-hydrocarbon radicals,
R² is selected from the group consisting of H and $(C_1-C_{10})$-hydrocarbon radicals, and
R and R' are selected individually from the group consisting of cyclohexyl, alkyl groups having 1 to 8 carbon atoms and aralkyl groups having 7 to 10 carbons atoms, a linear water-insoluble copolymer of monoethylenically unsaturated molecules comprising 2 to 50 mol percent of a hydroxyl-containing ester of an $\alpha,\beta$-monoethylenically unsaturated acid and from 98 to 50 mole percent of at least one monoethylenically unsaturated monomer copolymerizable with said hydroxyl containing ester, the amount of diether being at least an amount equivalent to the hydroxyl content of a copolymer containing 2 mol percent of hydroxyl-containing units, and 0.5 to 2% by weight, based on the sum of the weights of the copolymer and the diether, of an acid catalyst.

4. A composition according to claim 3 in which the catalyst is a zinc salt of a strong inorganic acid.

5. A composition comprising a methylene diether of the formula

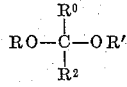

in which
R⁰ is selected from the group consisting of H and $(C_1-C_{10})$-hydrocarbon radicals,
R² is selected from the group consisting of H and $(C_1-C_{10})$-hydrocarbon radicals, and
R and R' are selected individually from the group consisting of cyclohexyl, alkyl groups having 1 to 8 carbon atoms and aralkyl groups having 7 to 10 carbon atoms, and a linear water-insoluble copolymer of monoethylenically unsaturated molecules comprising 2 to 50 mol percent of a hydroxyl-containing ester of an $\alpha,\beta$-monoethylenically unsaturated acid from 97.5 to 45 mole percent of at least one monoethylenically unsaturated monomer copolymerizable with said hydroxyl containing ester and ½ to 5% by weight of a copolymerizable $\alpha,\beta$-monoethylenically unsaturated acid, the amount of diether being at least an amount equivalent to the hydroxyl content of a copolymer containing 2 mol percent of hydroxyl-containing units.

6. A composition comprising a formal of the formula $ROCH_2OR'$ in which R and R' are selected individually from the group consisting of cyclohexyl, alkyl groups having 1 to 8 carbon atoms and aralkyl groups having 7 to 10 carbon atoms, and a linear water-insoluble copolymer of monoethylenically unsaturated molecules consisting of 2 to 50 mol percent of a hydroxyl-containing ester of an $\alpha,\beta$-monoethylenically unsaturated acid and from 98 to 50 mole percent of at least one monoethylenically unsaturated monomer copolymerizable with said hydroxyly containing ester, the amount of formal being at least an amount equivalent to the hydroxyl content of a copolymer containing 2 mol percent of hydroxyl-containing units.

7. A composition comprising a solution in an organic solvent of a formal of the formula $ROCH_2OR'$ in which R and R' are selected individually from the group consisting of cyclohexyl, alkyl groups having 1 to 8 carbon atoms and aralkyl groups having 7 to 10 carbon atoms, and a linear water-insoluble copolymer of monoethylenically unsaturated molecules consisting of 2 to 50 mol percent of a hydroxyl-containing ester of an $\alpha,\beta$-monoethylenically unsaturated acid and from 98 to 50 mole percent of at least one monoethylenically unsaturated monomer copolymerizable with said hydroxyl containing ester, the amount of formal being at least an amount equivalent to the hydroxyl content of a copolymer containing 2 mol percent of hydroxyl-containing units.

8. A composition as defined in claim 6 in which the amount of diether is at least sufficient to correspond to the stoichiometric equivalent of the hydroxyl content of the copolymer.

9. A composition comprising a formal of the formula $ROCH_2OR'$ in which R and R' are selected individually from the group consisting of cyclohexyl alkyl groups having 1 to 8 carbon atoms and aralkyl groups having 7 to 10 carbon atoms, and a linear water-insoluble copolymer of monoethylenically unsaturated molecules comprising 2 to 50 mol percent of a hydroxyl-containing ester of an $\alpha,\beta$-monoethylenically unsaturated acid and from 98 to 50 mole percent of at least one monoethylenically unsaturated monomer copolymerizable with said hydroxyl containing ester, the amount of formal being at least an amount equivalent to the hydroxyl content of a copolymer containing 2 mol percent of hydroxyl-containing units, and 0.5 to 2% by weight, based on the sum of the weights of the copolymer and the formal, of an acid catalyst.

10. A composition according to claim 9 in which the catalyst is a zinc salt of a strong inorganic acid.

11. A composition according to claim 9 in which the catalyst is zinc perchlorate.

12. A composition comprising a formal of the formula $ROCH_2OR'$ in which R and R' are selected individually from the group consisting of cyclohexyl, alkyl groups having 1 to 8 carbon atoms and aralkyl groups having 7 to 10 carbon atoms, and a linear water-insoluble copolymer of monoethylenically unsaturated molecules comprising 2 to 50 mol percent of a hydroxyl-containing ester of an $\alpha,\beta$-monoethylenically unsaturated acid from 97.5 to 45 mole percent of at least one monoethylenically unsaturated monomer copolymerizable with said hydroxyl containing ester and ½ to 5% by weight of a copolymerizable $\alpha,\beta$-monoethylenically unsaturated acid, the amount of formal being at least an amount equivalent to the hydroxyl content of a copolymer containing 2 mol percent of hydroxyl-containing units.

13. A composition comprising a formal of the formula $ROCH_2OR'$ in which R and R' are alkyl groups having 1 to 4 carbon atoms and the oxygen atoms are attached directly to primary carbon atoms of the alkyl groups, and a linear water-insoluble copolymer of monoethylenically unsaturated molecules consisting of 2 to 50 mol percent of a hydroxyl-containing ester of an α,β-monoethylenically unsaturated acid and from 98 to 50 mole percent of at least one monoethylenically unsaturated monomer copolymerizable with said hydroxyl containing ester, the amount of formal being at least an amount stoichiometrically equivalent to the hydroxyl content of a copolymer containing 2 mol percent of hydroxyl-containing units.

References Cited by the Examiner
UNITED STATES PATENTS 2,681,897 6/54 Frazier et al. ---------- 260—86.1
3,028,367 4/62 O'Brien -------------- 260—86.1

JOSEPH L. SCHOFER, Primary Examiner.
DONALD E. CZAJA, Examiner.